(12) United States Patent
Ott et al.

(10) Patent No.: US 11,543,266 B2
(45) Date of Patent: Jan. 3, 2023

(54) METHOD AND ASCERTAINMENT UNIT FOR ASCERTAINING A STATE VARIABLE OF A MAGNETIC ACTUATOR AT A PARTICULAR POINT IN TIME

(71) Applicant: Robert Bosch GmbH, Stuttgart (DE)

(72) Inventors: Christof Ott, Asperg (DE); Michael Hilsch, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 16/897,855

(22) Filed: Jun. 10, 2020

(65) Prior Publication Data

US 2021/0095998 A1 Apr. 1, 2021

(30) Foreign Application Priority Data

Sep. 27, 2019 (DE) .......................... 102019214941.3

(51) Int. Cl.
*G01D 5/14* (2006.01)
(52) U.S. Cl.
CPC ...................................... *G01D 5/14* (2013.01)
(58) Field of Classification Search
CPC .. G01D 5/14; H01F 2007/1888; H01F 7/1844
See application file for complete search history.

(56) References Cited

U.S. PATENT DOCUMENTS

2004/0196117 A1* 10/2004 Kiessling ............... G01D 5/485
                                                    333/157
2011/0234210 A1*  9/2011 Hayashi ................ H01F 7/1844
                                                    324/207.15

FOREIGN PATENT DOCUMENTS

DE      102017210607 A1   12/2018

* cited by examiner

*Primary Examiner* — Roy Y Yi
*Assistant Examiner* — Geoffrey T Evans
(74) *Attorney, Agent, or Firm* — Norton Rose Fulbright US LLP; Gerard Messina

(57) ABSTRACT

A method for ascertaining a state variable of a magnetic actuator at a particular point in time. The method includes a step of reading in and a step of calculating. In the step of reading in, a first sensor value and at least one second sensor value are read in, the first sensor value representing a physical variable identical to that of the second sensor value, and the first sensor value having been detected after the second sensor value. In the step of calculating, the state variable is calculated using the first sensor value and the second sensor value as input variables to at least one approximation function.

13 Claims, 4 Drawing Sheets

METHOD AND ASCERTAINMENT UNIT FOR ASCERTAINING A STATE VARIABLE OF A MAGNETIC ACTUATOR AT A PARTICULAR POINT IN TIME

CROSS REFERENCE

The present application claims the benefit under 35 U.S.C. § 119 of German Patent Application No. DE 102019214941.3 filed on Sep. 27, 2019, which is expressly incorporated herein by reference in its entirety.

BACKGROUND INFORMATION

The present invention is directed to a method and to an ascertainment unit for ascertaining a state variable of a magnetic actuator at a particular point in time. The present invention is also directed to a computer program.

Electromagnetic actuators, as they are used, for example, for hydraulic valves in factory automation or in mobile work machines, in pressure valves for vehicle transmissions or for direct-action control elements without a hydraulic circuit, have a movable part, also referred to as an armature, on which a force is generated by energizing a coil. This force and a resulting movement or position of the armature and parts coupled thereto in general serve a particular purpose in technical systems.

German Patent Application No. DE 10 2017 210 607 A1 describes a method and a device for activating a part movable with the aid of a coil, and a solenoid valve.

SUMMARY

In accordance with example embodiments of the present invention, an improved method for ascertaining a state variable of a magnetic actuator at a particular point in time, furthermore, an improved ascertainment unit that uses this method, and finally a corresponding computer program are provided. Advantageous refinements of and improvements on an example device in accordance with the present invention are possible with the measures described herein.

The present invention provides a possibility for improving an accuracy in the ascertainment of a state variable.

In accordance with an example embodiment of the present invention, a method is provided for ascertaining a state variable of a magnetic actuator at a particular point in time. The method includes a step of reading in and a step of calculating. In the step of reading in, a first sensor value and at least one second sensor value are read in, the first sensor value representing a physical variable identical to that of the second sensor value and the first sensor value having been detected after the second sensor value. In the step of calculating, the state variable is calculated using the first sensor value and the second sensor value as input variables of at least one approximation function.

The state variable to be ascertained may, for example, be a position, speed, magnetization state or a force of the magnetic actuator as it is implemented, for example, in factory automation or for vehicle transmissions. The first sensor may be detected, for example, with the aid of a measuring unit, the first sensor value being capable of representing an instantaneous value, for example. Accordingly, the second sensor value may represent a value that has been detected at an earlier point in time. In this way, it is advantageously possible to increase a precision of the method. The method and, additionally or alternatively, at least individual or all steps of the method are advantageously cyclically implementable again in predetermined intervals of, for example, 100 ms, 10 ms, 1 ms, 0.3 ms, 0.333 ms or 0.1 ms.

According to one specific embodiment of the present invention, the first sensor value, which represents an instantaneous current intensity and, additionally or alternatively, an instantaneous voltage value, may be read in in the step of reading in. This means that the first sensor value may represent the current intensity at the point in time of the detection and, additionally or alternatively, the voltage value at the point in time of the detection. In this way, it is possible to use easily detectable sensor values for ascertaining the state or the state variable of the magnetic actuator.

At least one additional sensor value, which has been detected prior to the second sensor value and which represents a physical variable identical to that of the first sensor value, may be read in in the step of reading in, the state variable further being capable of being calculated in the step of calculating using the additional sensor value as an input variable of at least one approximation function. This means that, for example, the additional sensor value represents an older value than the second sensor value. It is further possible that other, even older values are stored or read in, which are all usable, for example, as an input variable of the approximation function. Based on this, it is advantageously possible to determine more exactly a profile of a curve or of the state variable when the profile of the corresponding sensor values is considered over a time span.

According to one specific embodiment of the present invention, the method may include a step of ascertaining a preprocessed sensor value, at least the first sensor value, the second sensor value, the at least one additional sensor value and, additionally or alternatively, one parameter being capable of being linked to another in order to obtain the preprocessed sensor value. In the step of calculating, the state variable may be calculated using the preprocessed sensor value. The preprocessed sensor value may, for example, be ascertained from a difference between the first sensor value and the second sensor value, from a sliding average value or a sliding sum of sensor values, from a difference between average values over different time windows, from an analogous filtering of the sensor values or, for example, from a digital preprocessing of digital signals, from another filtering of various signal profiles or even from a model-based preprocessing. For this purpose, the parameter may be predefined, for example, using results from a laboratory test, in which the parameter has been ascertained empirically or by an evaluation of laboratory tests prior to the implementation of the parameter in a corresponding device or unit prior to a delivery of this device or unit.

According to one specific embodiment of the present invention, a third and at least one fourth sensor value may be read in in the step of reading in, the third sensor value representing a physical variable identical to that of the fourth sensor value but a physical variable different from that of the first sensor variable, the third sensor value having been detected after the fourth sensor value. In the step of calculating, the state variable may further be calculated using the third and the fourth sensor value as input variable of the at least one approximation function. The third sensor value may also have been recorded at an identical point in time as the first sensor value. The third and the fourth sensor value make it possible to be able to ascertain the state variable using an additional physical variable, so that it is possible to ascertain an even more precise value for the state variable.

The third sensor value and the fourth sensor value may, for example, also represent a current intensity or a voltage value.

According to one specific embodiment of the present invention, at least one additional sensor value, which has been detected prior to the fourth sensor value, and which represents a physical value identical to that of the fourth sensor value, may be read in in the step of reading in. In the step of calculating, the state variable may further be calculated using the additional sensor value as input variable of at least one approximation function. The additional sensor value may, for example, refer to a value of the same physical variable as that of the third and the fourth sensor value.

In the step of ascertaining, the third sensor value, the fourth sensor value, the additional sensor value and, additionally or alternatively, the parameter, may be linked to one another in order to obtain an additional preprocessed sensor value. In the step of calculating, the state variable may be calculated using the additional preprocessed sensor value. The parameter in this case may, for example, also be a predefined value, for example, using results from a laboratory test, in which the parameter has been ascertained empirically or by an evaluation of laboratory test prior to the implementation of the parameter in a corresponding device or unit prior to a delivery of this device or unit. In this way, it is advantageously possible to calculate a more exact state variable in the step of calculating.

According to one specific embodiment of the present invention, the state variable may be calculated in the step of calculating using a magnetization value ascertained on the basis of a hysteresis model of a magnetization of the magnetic actuator, the state variable being capable of being calculated in the step of calculating using the magnetization value. This means that the magnetization value is ascertained on the basis of a delayed change in effect after the change of the cause, and this magnetization value is utilized for the calculation of the state value.

According to one specific embodiment of the present invention, the state variable may be calculated in the step of calculating as an approximation function using a sum of approximation functions, in particular, which are linked in a series connection and, additionally or alternatively, in a parallel connection, and additionally or alternatively, using at least one radial base function of a neural network, a polynomial function and, additionally or alternatively, a characteristic diagram. In this way, it is possible to implement a very flexible and precise option for ascertaining the state variable.

In the step of reading in, the first sensor value and, additionally or alternatively, the second sensor value may be read in as a sample value, which is synchronized or becomes synchronized with a switching edge of a pulse width modulation signal. The sample value may, for example, be on a curve, via which, for example, a period duration may be represented in the form of a graph. In this way, a specification of the state variable to be ascertained may take place, since sensor values are used which are detected at particular points in time that are particularly relevant for the ascertainment of the state variable.

According to one specific embodiment of the present invention, the first sensor value and the second sensor value may be read in in the step of reading in, a time span between the first sensor value and the second sensor value and between the second sensor value and the additional sensor value capable of being identical within one tolerance range. The tolerance range may, for example, include a deviation of 10% or 20% from the respective sensor value used as the reference value. In this way, it is possible to carry out a better approximation of the state value, since a good prediction of the state variable based on the input variables used is possible using the temporal profile in the past.

This method may be implemented in software or in hardware or in a mixed form made up of software and hardware, for example, in a control unit.

The present invention further provides an ascertainment unit, which is designed to carry out, control or implement the steps of a variant of an example method presented herein in corresponding units. With this embodiment variant of the present invention in the form of an ascertainment unit as well, it is possible to quickly and efficiently achieve the object underlying the present invention.

For this purpose, the ascertainment unit may include at least one processing unit for processing signals or data, at least one memory unit for storing signals or data, at least one interface to a sensor or to an actuator for reading in sensor signals from the sensor or for outputting control signals to the actuator and/or at least one communication interface for reading in or outputting data, which are embedded in a communication protocol. The processing unit may, for example, be a signal processor, a microcontroller or the like, the memory unit capable of being a flash memory, an EPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

An ascertainment unit in the present case may be understood to mean an electrical device which processes sensor signals and, as a function thereof, outputs control signals and/or data signals. The ascertainment unit may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made up at least partly of discrete components. In a software design, the interfaces may be software modules, which are present, for example, on a microcontroller alongside other software modules.

In one advantageous embodiment of the present invention, a method for ascertaining a state variable of a magnetic actuator at a particular point in time is controlled by the ascertainment unit. For this purpose, the ascertainment unit may, for example, access sensor signals such as a first sensor value, which represents a physical variable identical to that of the second sensor value and has been detected after a second value, and the second sensor value. The activation takes place via actuators such as a read-in unit, which is designed to read in the first sensor value and the second sensor value, and a calculation unit, which is designed to calculate the state variable using the first sensor value and the second sensor value as an input variable of at least one approximation function.

Also advantageous is a computer program product or a computer program having program code, which may be stored on a machine-readable medium or memory medium, such as a semiconductor memory, a hard disk memory or an optical memory, and which is used for carrying out, implementing and/or activating the steps of the method according to one of the previously described specific embodiments, in particular, when the program product or program is executed on a computer or on an ascertainment unit.

BRIEF DESCRIPTION OF THE DRAWINGS

Exemplary embodiments of the present invention are depicted in the figures and explained in greater detail below.

In the description below of preferred exemplary embodiments of the present invention, identical or similar reference numerals are used for elements which are represented in the various figures and act similarly, a repeated description of these elements being omitted.

DETAILED DESCRIPTION OF EXAMPLE EMBODIMENTS

Figure 1:
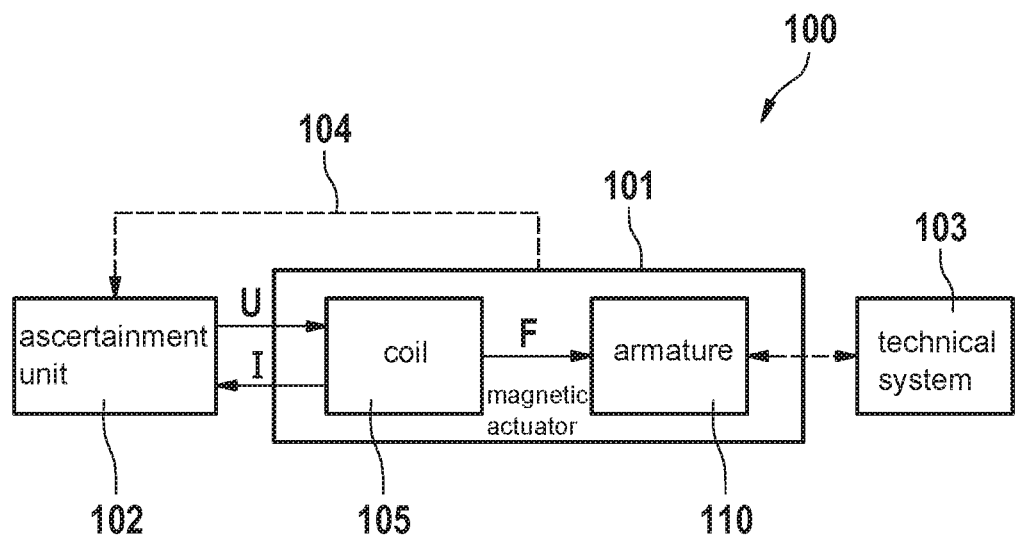
FIG. 1 schematically shows a representation of a unit including a magnetic actuator according to one exemplary embodiment of the present invention.

FIG. 1 schematically shows a representation of a unit 100 including a magnetic actuator 101 according to one exemplary embodiment. Unit 100 according to this exemplary embodiment includes an ascertainment unit 102, a magnetic actuator 101 and a technical system 103 coupled to magnetic actuator 101. Magnetic actuator 101 is implemented, for example, as a component, for example, as an actuator, for technical system 103. Ascertainment unit 102 in this case is designed to control magnetic actuator 101 and to ascertain a state variable with the aid of detected values 104, which are explained more precisely in one of the following figures. Values 104 in this case may also include values of voltage U and of current I. The state variable represents, for example, a position, a speed, a magnetization state, a temperature or a force of magnetic actuator 101 or a component of magnetic actuator 101. According to this exemplary embodiment, magnetic actuator 101 includes a coil 105 and a so-called armature 110. Armature 110 according to this exemplary embodiment is implemented or is implementable as a movable part of magnetic actuator 102. If, for example, coil 105 is energized, then according to this exemplary embodiment, a force F acts on armature 110 or on an actuator coupled to armature 110, thereby actuating technical system 103. To achieve this, a voltage U is set, for example, by ascertainment unit 102, thereby generating a current I which, according to this exemplary embodiment, flows through coil 105.

In other words, a magnetic actuator 101 including a control, which is referred to here as ascertainment unit 102, is shown, in which a voltage U is adjusted in order to generate a current I, which in turn results in a force F on armature 110. The current is usually detected using a sensor and the adjusted voltage is known in the control, i.e., in ascertainment unit 102. For various purposes, it is of interest to know state variables in ascertainment unit 102, such as the position, speed, magnetization state, temperature, force, etc. of magnetic actuator 101. For reasons of cost and due to limited installation space, it has frequently not been previously possible to install a sensor system for these state variables. To solve this problem, the approach presented herein represents a possibility of utilizing a retroaction of the state variables on the relationship between voltage U and current I, in order to ascertain in ascertainment unit 102 the state variables of magnetic actuator 101 unknown to date based on these two known variables. The approach is advantageously implementable in an updated ascertainment unit 102 if corresponding functions are present that presuppose a precise knowledge of state variables, but for which no dedicated sensor system is installed in unit 100. For example, if the state variable "armature stroke" is very precisely adjusted without a travel sensor system, this means with a travel resolution of better than 100 μm, or a force F is very precisely adjusted, even though a force characteristic curve of magnetic actuator 101 according to one exemplary embodiment is clearly stroke-dependent.

Figure 2:
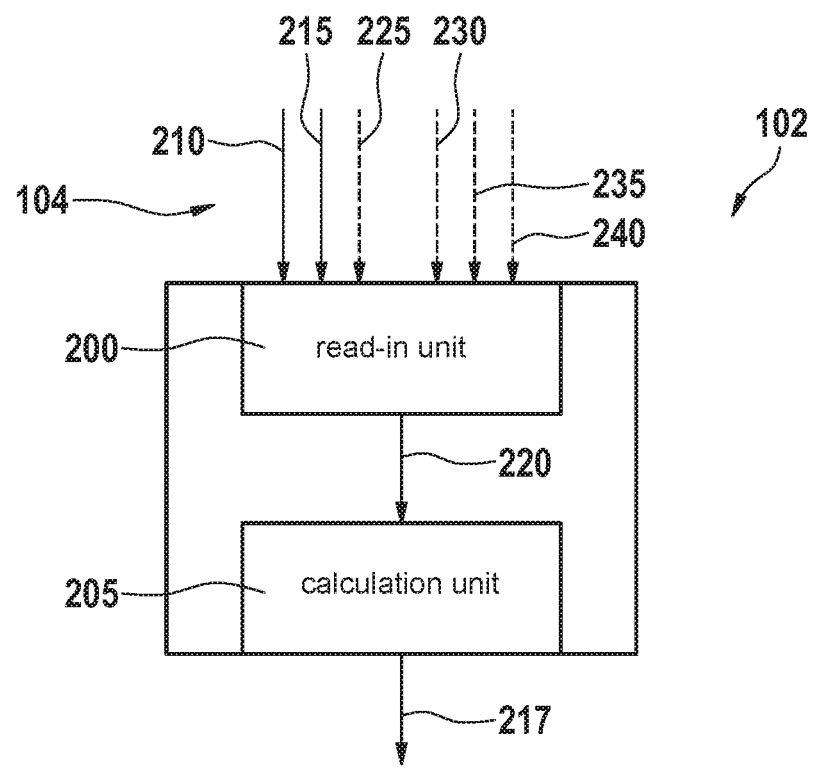
FIG. 2 shows a block diagram of an ascertainment unit according to one exemplary embodiment of the present invention.

FIG. 2 shows a block diagram of an ascertainment unit 102 according to one exemplary embodiment. Ascertainment unit 102 according to this exemplary embodiment includes a read-in unit 200 and a calculation unit 205. Read-in unit 200 in this case is designed to read in values 104 referred to in FIG. 1, namely a first sensor value 210 (referred to hereinafter as $l_k$ or $U_k$) and a second sensor value 215 (referred to hereinafter as $l_{k-1}$ or $U_{k-1}$). First sensor value 210 in this case represents a physical variable identical to that of second sensor value 215. The physical value is a voltage value U or a current intensity I, for example. Second sensor value 215 (here, for example, $l_{k-1}$) has been detected in this case prior to first sensor value 210 (here, for example, $l_k$). Calculation unit 205 is designed to calculate state variable 217 using first sensor value 210 and second sensor value 215 as input variable 220 of at least one approximation function. In short, this means that read-in sensor values 210, 215 are provided as input variable 220 to calculation unit 205 and inserted there in the respective approximation function and therefore also evaluated in order to obtain state variable 217.

Read-in unit 200 according to this exemplary embodiment is further designed to read in an additional sensor value 225, a third sensor value 230, a fourth sensor value 235 as well as an additional sensor value 240. Additional sensor value 225 (here, for example, $l_{k-2}$) in this case is a value, which according to this exemplary embodiment has been detected prior to second sensor value 215 (here, for example, $l_{k-1}$). Additional sensor value 225 according to this exemplary embodiment is also a value of the same physical variable as that of first sensor value 210 and of second sensor value 215. Third sensor value 230, fourth sensor value 235, as well as additional sensor value 240 (which represent, for example, a different physical variable, such as a voltage U, than the first, second and third sensor value), behave similarly over time, for example, to first sensor value 210, second sensor value 215 and additional sensor value 225.

Third sensor value 230 (here, for example, $U_k$) may thus be detected after fourth sensor value 235 (here, for example, $U_{k-1}$) which, in turn, has been recorded prior to additional sensor value 240 (here, for example, $U_{k-2}$). This also means that according to this exemplary embodiment, additional sensor value 225 as well as third sensor value 230, fourth sensor value 235 and additional sensor value 240 are also usable as input variable 220 of the at least one approximation function and from which state variable 217 is ascertained.

In other words, a data-based state variable identification for magnetic actuators is presented, which, according to this exemplary embodiment, provides a use of an approximator for implementing the approximation function, which is/are composed of or encompass(es) one or multiple static approximation function(s). The approximation functions are also designatable as initial functions. Static in this case means that an output or the output value of the approximator is a function only of its input variables, not of hidden internal states of the approximator. The parameters of the approximation functions according to this exemplary embodiment are uniquely determined prior to a serial application via suitable algorithms based on measured training data. The parameters remain constant during operation. Such an approximator may be efficiently implemented on ascertainment unit 102, in particular, if a specific hardware support is provided for static approximation functions. Specifically, the approximator is trained using a software and calculated on a special hardware.

The influences from a past profile of measured variables U, I, i.e., sensor values 210, 215, 225, 230, 235, 240 necessarily to be considered for a determination of state variables 217, are optionally taken into account in a preprocessing layer. This preprocessing layer includes, for example, memory elements, filters or model-based calculations, which have an internal state. The elements of the preprocessing layer are optionally efficiently implementable on updated ascertainment unit 102, which is also referred to as a control unit.

Figure 3:
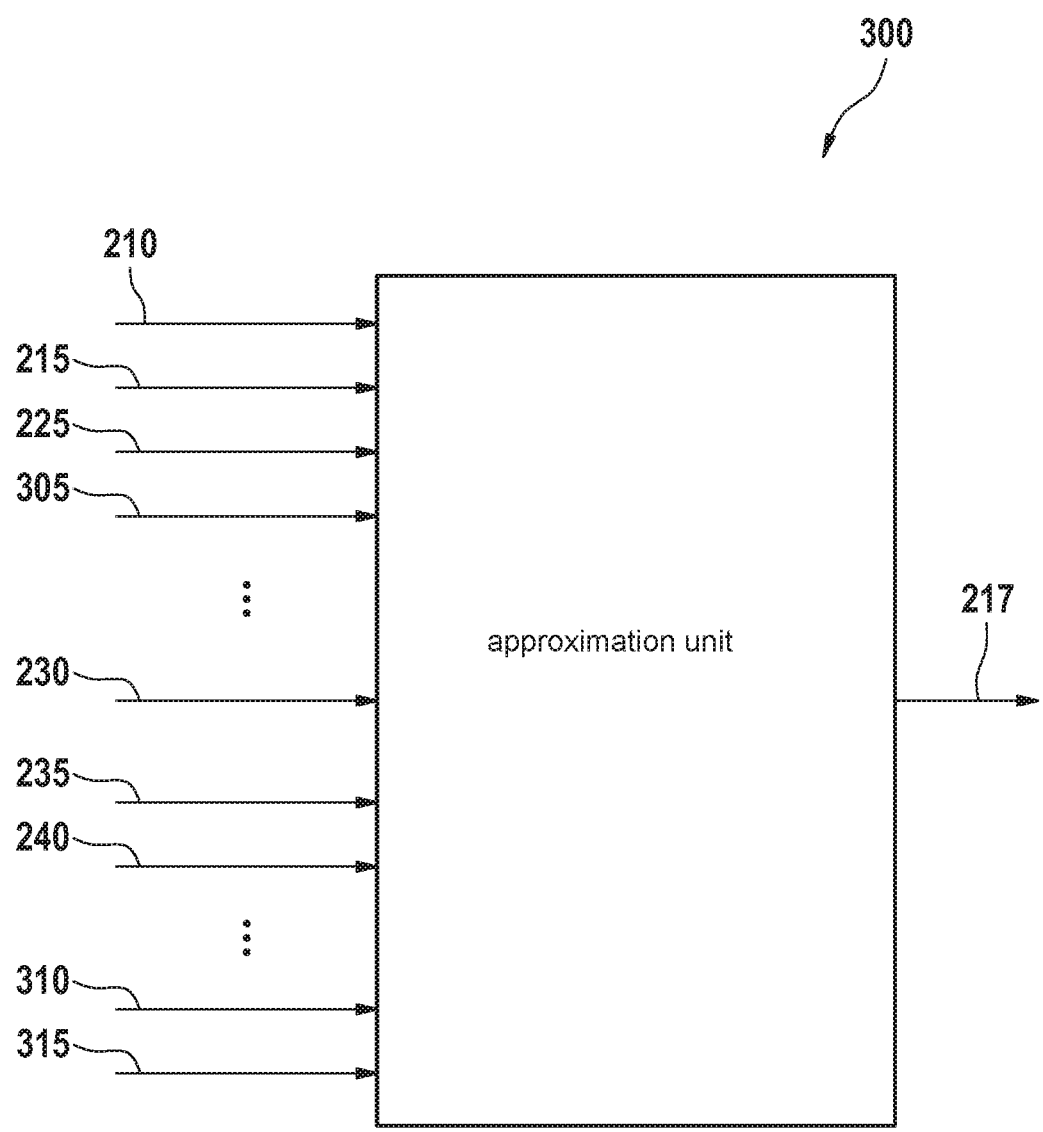
FIG. 3 schematically shows a representation of an approximation unit according to one exemplary embodiment of the present invention.

FIG. 3 schematically shows a representation of an approximation unit 300 according to one exemplary embodiment. According to this embodiment, approximation unit 300 is implementable within the ascertainment unit as it has been described in FIG. 2. According to this exemplary embodiment, first sensor value 210, second sensor value 215, additional sensor value 225 as well as third sensor value 230, fourth sensor value 235 and additional sensor value 240 are further processed, so that state variable 217 is ascertained. According to this exemplary embodiment, first sensor value 210, second sensor value 215, the at least one additional sensor value and/or a parameter 305 are also linked to one another in order to obtain a preprocessed sensor value. In this case, state variable 217, for example, is calculated using the preprocessed sensor value. Third sensor value 230, fourth sensor value 235, additional sensor value 240 and/or an additional parameter 310 are also linked to one another according to this exemplary embodiment, in order to obtain an additional preprocessed sensor value. State variable 217 in this case may be calculated using the additional preprocessed sensor value. The preprocessed sensor value and/or the additional preprocessed sensor value is/are optionally usable as an input variable of the at least one approximation function, for example. According to this exemplary embodiment, state variable 217 is further also calculable, for example, using a magnetization value 315 ascertained on the basis of a hysteresis model of a magnetization of the magnetic actuator.

In other words, approximation unit 300, which is also referred to as an approximator, is designed to determine or ascertain state variable 217. An instantaneous point in time according to one exemplary embodiment is identified with the index k, so that a value at the instantaneous point in time, which is described here as first sensor value 210 or third sensor value 230, is also designatable as $I_k$ or $U_k$, since instantaneous or past values of current I and voltage U are incorporated into the model according to this exemplary embodiment. Values from different points in time in the past relative to this point in time are identified according to one exemplary embodiment with indices k-1, k-2, etc. These past values are also referred to here as second sensor value 215, additional sensor value 225, as fourth sensor value 235 or as additional sensor value 240.

According to one alternative exemplary embodiment, preprocessed parameters of current and voltage are also usable such as, for example, a difference between an instantaneous measured value and a measured value stored in the past, a sliding average value or a sliding sum of measured values, a difference formation between average values across various time windows, an analog filtering of measured values or digital preprocessing of digital signals, another filtering of the signal curves, for example, with the aid of high-pass, band-pass or low-pass, as well as a model-based preprocessing such as, for example, observer equations or a parameter estimation.

To improve the accuracy, $M_k$ may be used. $M_k$ according to one exemplary embodiment refers to the continuous calculation of magnetization value 315 of the magnetic actuator using a suitable hysteresis model, which is updated during the preprocessing with each new time step k. Approximation unit 300 according to this exemplary embodiment is made up of an approximation function, a sum of approximation functions or also of the series connection or parallel connection of approximation functions. Optionally, radial base functions, a neural network or a polynomial approach are particularly suitable. Characteristic diagrams or a combination of the aforementioned elements with one another are also possible according to one exemplary embodiment. As is also apparent, it may be meaningful to switch between various approximators in peripheral areas as a function of the type of magnetic actuator. Parameters 305, 310 of the approximation functions are optionally determined via a suitable optimization calculation based on measured data, i.e., based on sensor values 210, 215, 225, 230, 235, 240 and their preprocessed values. To generate these sensor values 210, 215, 225, 230, 235, 240, a test stand including an auxiliary sensor system for the state variables 217 of interest is possible according to one optional exemplary embodiment. Such a parameter determination takes place according to one exemplary embodiment in a design phase prior to a serial operation in the ascertainment unit.

Figure 4:
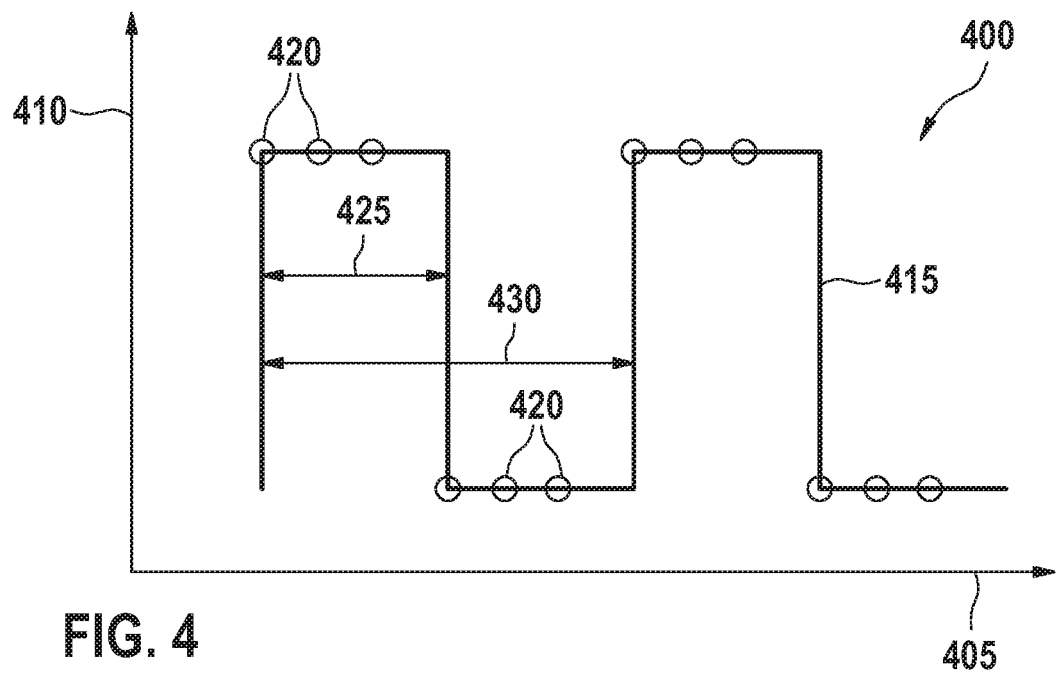
FIG. 4 shows a curve diagram for a voltage profile according to one exemplary embodiment of the present invention.

FIG. 4 shows a diagram of a voltage profile 400 according to one exemplary embodiment. Voltage profile 400 depicted here is implementable, for example, for a unit including magnetic actuators as it has been described in FIG. 1. An x-axis 405 of the curve diagram describes a progression of time and a y-axis 410 of the curve diagram refers to a voltage value, so that voltage profile 400 is reflected by sample values 420 on a curve 415. The voltage according to this exemplary embodiment is to be understood as a pulse width modulated voltage (PWM), with which a magnetic actuator as it has been described in FIG. 1 is controlled. According to this exemplary embodiment, a time span 425 is adjustable relative to a period duration 430 of voltage profile 400. According to this exemplary embodiment, it is apparent that sample values 420 exhibit variously high voltage values within a period duration 430, so that curve 415 depicted herein alternatingly displays a high voltage and a low voltage.

In other words, magnetic actuators having a pulse width modulated voltage (PWM) are activatable. By changing time Th, which is referred to here as time span 425 or duty cycle, relative to period duration 430, in short also identifiable as Tpwm, of the rectangular voltage profile 400, it is thus possible to set an average voltage and thus an average current with low losses. Rectangular voltage profile 400 results in a current profile as it is depicted in one of the following figures. Typical period durations 430 according to this exemplary embodiment are, for example, 10 ms, 1 ms, 0.3 ms, 0.333 ms, 0.125 ms or 0.1 ms. In the case of such a type of activation, it is advantageous to design the approximator synchronously relative to a switching edge of the PWM. Depending on how frequently a piece of information about the state variables to be determined is required, the approximator may then be evaluated in the timeframe of period duration 430 or in an integer multiple thereof. The preprocessing layer in this case is preferably also calculable synchronously relative to switching edges, if necessary, in a quicker timeframe than the approximator. Particularly if the approximator is implemented in the timeframe of period duration 430 and not in an integer multiple thereof and period duration 430 is short relative to the electromagnetic processes, the memories play an important role in the preprocessing layer: in order to make all relevant electromagnetic processes visible for the approximator, it is advantageous if the preprocessing layer provides the approximator average values, average value changes, magnetization changes, etc., from one or from multiple past PWM periods.

Thus, according to this exemplary embodiment, a position of sample values 420 is shown in an evaluation of the approximator in the timeframe of period duration 430. Sample values 420 of the voltage and the sample values of the current as they are shown in one of the following figures are synchronous relative to a switching edge from lower to higher voltage during a high phase. Sample values 420 during a low phase are correspondingly synchronous relative to the switching edge from higher to lower voltage. Less advantageous but entirely possible is the synchronicity of sample values 420 relative to only one of the two switching edges. Sample values 420 are situated optionally both equidistant as well as at different intervals relative to one another.

Within period duration 430, the current and voltage samples are detected after the switching edge from lower to higher voltage and operations of the preprocessing layer such as, for example, a sliding average value of the current samples are detected in a rapid timeframe. Once the last current sample is detected, the approximator is evaluated according to this exemplary embodiment, so that an updated calculation of the state variables is present by the end of the instantaneous PWM period with period duration 430 or at the beginning of a next period. According to one exemplary embodiment, a calculation of the preprocessing steps is also meaningful only after the detection of the last current sample and/or voltage sample, depending on the type of a preprocessing and available computing time. According to one exemplary embodiment, the detection of the current samples and/or voltage samples also begins again, if necessary simultaneously, with the new period. A sensor system for the voltage at the magnetic actuator is frequently unavailable due to costs. However, the supply voltage or battery voltage is detected metrologically and the duty cycle with time span 425 and period duration 430 are known variables in the ascertainment unit. Required sample values 420 at the magnetic actuator are then calculable at each point in time, taking into account the voltage drop at, for example, lines, freewheeling diodes and further components of the output stage. Instead of the sample values 420 just described, it may be meaningful, depending on the type of the electro-technical activation circuit, to directly use the measured battery voltage and the duty cycle with time span 425 as the input variable of the preprocessing layer. A period duration 430, which is short compared to mechanical time constants of the magnetic actuator, is particularly advantageous. A speed of the armature over period duration 430 is then approximately constant, so that the voltage induced by the armature movement does not distort individual measuring points within the PWM period.

Figure 5:
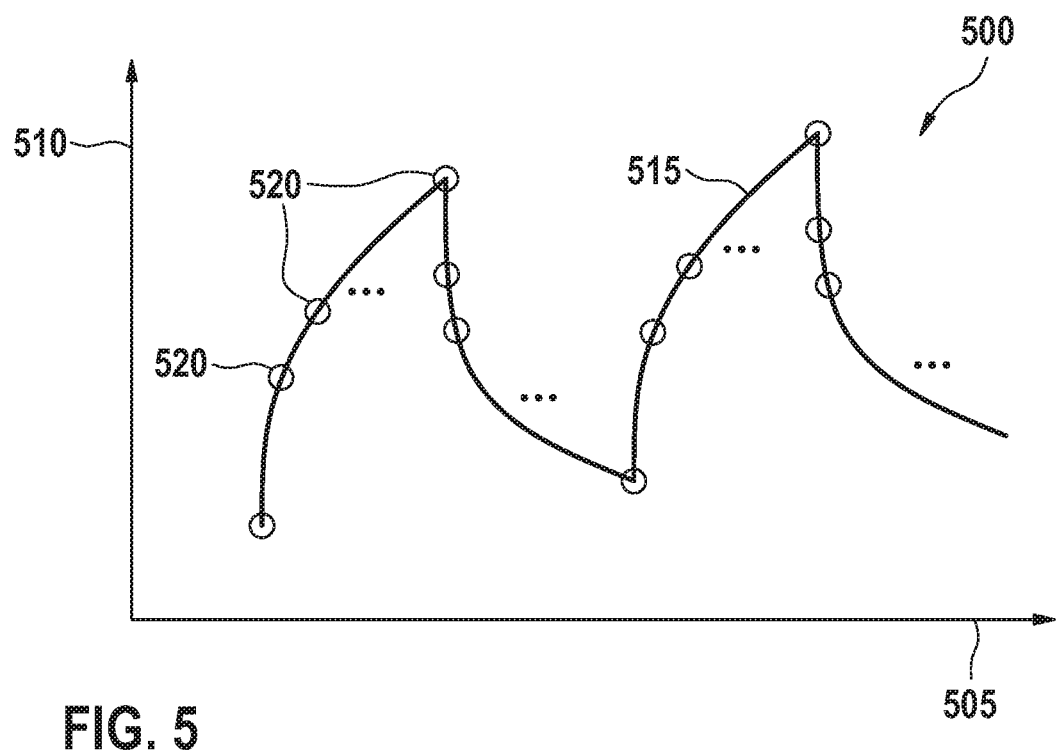
FIG. 5 shows a curve diagram for a current profile according to one exemplary embodiment of the present invention.

FIG. 5 shows a diagram of a current profile 500 according to one exemplary embodiment. Current profile 500 depicted here is implementable, for example, for a unit including magnetic actuators as it has been described in FIG. 1. Current profile 500 is further attributed to the voltage profile as it has been described in FIG. 4. Accordingly, an x-axis 505 of the curve diagram also describes a progression of time and a y-axis 510 of the curve diagram refers to a current value, so that current profile 500 is reflected by sample values 520 on a curve 515. According to this exemplary embodiment, this is current profile 500 during a PWM activation as it has also been described in FIG. 4. According to this exemplary embodiment, the current increases sharply and then drops sharply.

Figure 6:
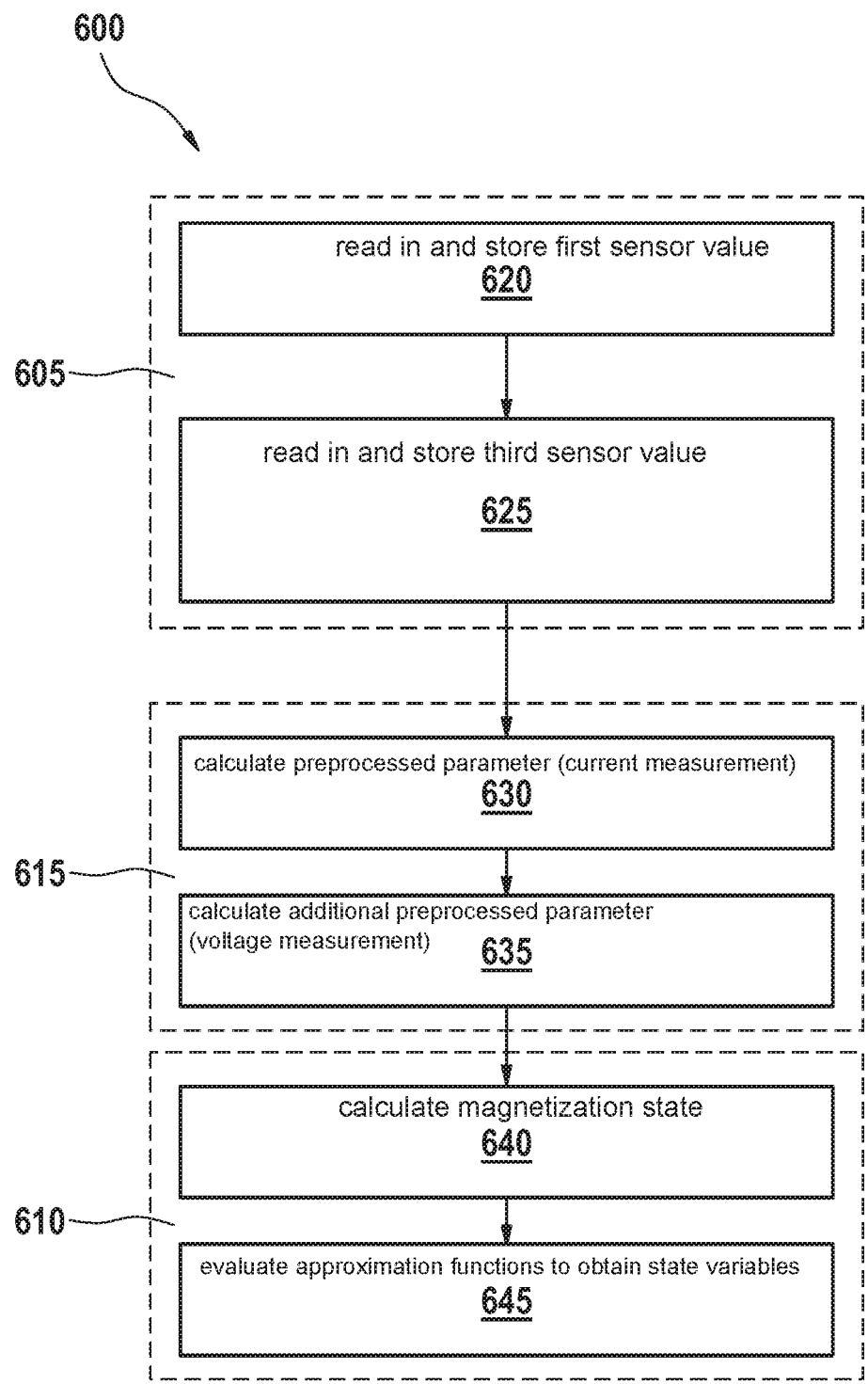
FIG. 6 shows a flow chart of a method for ascertaining a state variable of a magnetic actuator at a particular point in time according to one exemplary embodiment of the present invention.

FIG. 6 shows a flow chart of a method 600 for ascertaining a state variable of a magnetic actuator at a particular point in time according to one exemplary embodiment. The aim of the method is a calculation of the state variables as they have previously been described in FIG. 2 or FIG. 3. According to this exemplary embodiment, method 600 is implementable by an ascertainment unit as it has been described in FIG. 1 or 2. Method 600 in this case includes a step 605 of reading in and a step 610 of calculating. In step 605 of reading in, a first sensor value and at least one second sensor value are read in, the first sensor value representing a physical variable identical to that of the second sensor value. In addition, the first sensor value has been detected after the second sensor value. In step 610 of calculating, the state variable is calculated using the first sensor value and the second sensor value as input variables of at least one approximation function.

According to this exemplary embodiment, method 600 further includes a step 615 of ascertaining, which according to this exemplary embodiment is implementable prior to step 610 of calculating. In step 615 of ascertaining, a preprocessed sensor value is ascertained, at least the first sensor value, the second sensor value, the at least one additional sensor value and/or a parameter being linked to one another in order to obtain the preprocessed sensor value. The state variable is then calculated in step 610 of calculating using the preprocessed sensor value.

The first sensor value and/or the second sensor value is/are optionally read in in step 605 of reading in as a sample value, which is synchronized or becomes synchronized with a switching edge of a pulse width modulation signal. Further according to this exemplary embodiment, the first sensor value and the second sensor value are read in, a time span between the first sensor value and the second sensor value and between the second sensor value and the additional sensor value being identical within a tolerance range. Further according to this exemplary embodiment, the state variable is calculated in step 610 of calculating using a sum of approximation functions. This means that the approximation functions are linked, in particular, in series connection and/or in parallel connection and/or are calculated as approximation function using at least one radial base function of a neural network, a polynomial function and/or a characteristic diagram.

According to this exemplary embodiment, steps 605, 615, 610 of method 600 are each optionally divisible into substeps 620, 625, 630, 635, 640, 645. According to this exemplary embodiment, the first sensor value is read in and stored in substep 620. In substep 625, the third sensor value, for example, is read in, stored and, if it is a voltage value, the set voltage is calculated. Substeps 620, 625 form according to this exemplary embodiment step 605 of method 600. In substep 630, the preprocessed parameter is calculated, which may, for example, also be referred to as a preprocessed current measurement. Substep 635 according to this exemplary embodiment describes a calculation of the additional preprocessed parameter which, for example, is also referred to here as a preprocessed voltage measurement. Substeps 630, 635 according to this exemplary embodiment form step 615 of method 600. In substep 640, a magnetization state according to this exemplary embodiment is optionally calculated, which is also referred to as a magnetization value. Substep 645 describes an evaluation of the approximation functions in order to obtain the state variable. Substeps 640, 645 according to this exemplary embodiment form step 610 of method 600.

In other words, an example flow chart according to this exemplary embodiment is shown for calculating or determining the state variables. This sequence is repeated on the ascertainment unit in regular time intervals, typical intervals therefore according to this exemplary embodiment being 100 ms, 10 ms, 1 ms 0.3 ms, 0.333 ms and 0.1 ms. According to one alternative exemplary embodiment, an embodiment in irregular time intervals is possible. The preprocessing and the updating of the magnetization state take place after step 605 of reading in after step 615 of ascertaining the new and stored values of current and voltage. The approximation functions are subsequently evaluated in the approximator in order to obtain the state values of interest.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for ascertaining a state variable of a magnetic actuator at a particular point in time, the method comprising the following steps:
reading in a first sensor value and at least one second sensor value, the first sensor value representing a physical variable identical to a physical variable represented by the second sensor value, the first sensor value having been detected after the second sensor value;
calculating, using at least one approximation function, the state variable, using the first sensor value and the second sensor value as input variables to the at least one approximation function, and
ascertaining a preprocessed sensor value, at least the first sensor value and/or the second sensor value and/or an at least one additional sensor value and/or a parameter being linked to one another to obtain the preprocessed sensor value, and the state variable is calculated in the step of calculating using the preprocessed sensor value.

2. The method as recited in claim 1, wherein in the step of reading in, the first sensor value is read in, which represents an instantaneous current intensity and/or an instantaneous voltage value.

3. The method as recited in claim 1, wherein in the step of calculating, the state variable is calculated using: (i) a sum of approximation functions, the approximation function being linked in a series connection and/or in a parallel connection and/or (ii) at least one radial base function, and/or (iii) using a neural network, and/or (iv) a polynomial function, and/or (v) a characteristic diagram.

4. A method for ascertaining a state variable of a magnetic actuator at a particular point in time, the method comprising the following steps:
reading in a first sensor value and at least one second sensor value, the first sensor value representing a physical variable identical to a physical variable represented by the second sensor value, the first sensor value having been detected after the second sensor value; and
calculating, using at least one approximation function, the state variable, using the first sensor value and the second sensor value as input variables to the at least one approximation function,
wherein in the step of reading in, at least one additional sensor value is read in, which has been detected prior to the second sensor value, and which represents a physical variable identical to the physical variable represented by the first sensor value, the state variable further being calculated in the step of calculating using the additional sensor value as an input variable to the at least one approximation function.

5. The method as recited in claim 4, further comprising the following step:
ascertaining a preprocessed sensor value, at least the first sensor value and/or the second sensor value and/or the at least one additional sensor value and/or a parameter being linked to one another to obtain the preprocessed sensor value, and the state variable is calculated in the step of calculating using the preprocessed sensor value.

6. The method as recited in claim 4, wherein in the step of reading in, the first sensor value and the second sensor value are read in, a time span between the first sensor value and the second sensor value and between the second sensor value and the additional sensor value being identical within a tolerance range.

7. A method for ascertaining a state variable of a magnetic actuator at a particular point in time, the method comprising the following steps:
reading in a first sensor value and at least one second sensor value, the first sensor value representing a physical variable identical to a physical variable represented by the second sensor value, the first sensor value having been detected after the second sensor value; and
calculating, using at least one approximation function, the state variable, using the first sensor value and the second sensor value as input variables to the at least one approximation function,
wherein in the step of reading in, a third and at least one fourth sensor value are read in, the third sensor value representing a physical variable identical to a physical variable represented by the fourth sensor value, but different from the physical variable represented by the first sensor value, the third sensor value having been detected after the fourth sensor value, and the state variable further being calculated in the step of calculating using the third and the fourth sensor values as input variables to the at least one approximation function.

8. The method as recited in claim 7, wherein in the step of reading in, at least one additional sensor value is read in, which has been detected prior to the fourth sensor value, and which represents a physical variable identical to the physical variable represented by the fourth sensor value, the state variable further being calculated in the step of calculating using the additional sensor value as an input variable to the at least one approximation function.

9. The method as recited in claim 8, wherein in the step of ascertaining, the third sensor value and/or the fourth sensor value and/or the additional sensor value and/or an additional parameter are linked to one another to obtain an additional preprocessed sensor value, and the state variable is calculated in the step of calculating using the additional preprocessed sensor value.

10. A method for ascertaining a state variable of a magnetic actuator at a particular point in time, the method comprising the following steps:
   reading in a first sensor value and at least one second sensor value, the first sensor value representing a physical variable identical to a physical variable represented by the second sensor value, the first sensor value having been detected after the second sensor value; and
   calculating, using at least one approximation function, the state variable, using the first sensor value and the second sensor value as input variables to the at least one approximation function,
   wherein in the step of calculating, the state variable is calculated using a magnetization value ascertained based on a hysteresis model of a magnetization of the magnetic actuator, the state variable being calculated in the step of calculating using the magnetization value.

11. A method for ascertaining a state variable of a magnetic actuator at a particular point in time, the method comprising the following steps:
   reading in a first sensor value and at least one second sensor value, the first sensor value representing a physical variable identical to a physical variable represented by the second sensor value, the first sensor value having been detected after the second sensor value; and
   calculating, using at least one approximation function, the state variable, using the first sensor value and the second sensor value as input variables to the at least one approximation function,
   wherein in the step of reading in, the first sensor value and/or the second sensor value, is read in as a sample value, which is synchronized or becomes synchronized with a switching edge of a pulse width modulation signal.

12. An ascertainment unit for ascertaining a state variable of a magnetic actuator at a particular point in time, the ascertainment unit configured to:
   read in a first sensor value and at least one second sensor value, the first sensor value representing a physical variable identical to a physical variable represented by the second sensor value, the first sensor value having been detected after the second sensor value;
   calculate using at least one approximation function, the state variable, using the first sensor value and the second sensor value as input variables to the at least one approximation function, and
   ascertain a preprocessed sensor value, at least the first sensor value and/or the second sensor value and/or an at least one additional sensor value and/or a parameter being linked to one another to obtain the preprocessed sensor value, and the state variable is calculated in the step of calculating using the preprocessed sensor value.

13. A non-transitory machine-readable memory medium on which is stored a computer program for ascertaining a state variable of a magnetic actuator at a particular point in time, the computer program, when executed by a computer, causing the computer to perform the following steps:
   reading in a first sensor value and at least one second sensor value, the first sensor value representing a physical variable identical to a physical variable represented by the second sensor value, the first sensor value having been detected after the second sensor value;
   calculating, using at least one approximation function, the state variable, using the first sensor value and the second sensor value as input variables to the at least one approximation function, and
   ascertaining a preprocessed sensor value, at least the first sensor value and/or the second sensor value and/or an at least one additional sensor value and/or a parameter being linked to one another to obtain the preprocessed sensor value, and the state variable is calculated in the step of calculating using the preprocessed sensor value.

\* \* \* \* \*